(12) United States Patent
Lee

(10) Patent No.: US 12,187,072 B2
(45) Date of Patent: Jan. 7, 2025

(54) HUB DEVICE

(71) Applicant: Chung-Che Lee, Taichung (TW)

(72) Inventor: Chung-Che Lee, Taichung (TW)

( * ) Notice: Subject to any disclaimer, the term of this patent is extended or adjusted under 35 U.S.C. 154(b) by 456 days.

(21) Appl. No.: 17/750,051

(22) Filed: May 20, 2022

(65) Prior Publication Data

US 2023/0373242 A1    Nov. 23, 2023

(51) Int. Cl.
*B60B 27/02*    (2006.01)
*F16D 7/04*    (2006.01)

(52) U.S. Cl.
CPC ............. *B60B 27/02* (2013.01); *F16D 7/044* (2013.01)

(58) Field of Classification Search
CPC ..... B60B 27/02; B60B 27/023; B60B 27/047; F16D 7/044; F16D 41/30
See application file for complete search history.

(56) References Cited

U.S. PATENT DOCUMENTS

| | | | |
|---|---|---|---|
| 9,676,233 B1 * | 6/2017 | Chen ........................ | F16D 41/30 |
| 2011/0220449 A1 * | 9/2011 | Chiang ................... | F16D 41/30 |
| | | | 192/64 |
| 2015/0060224 A1 * | 3/2015 | Lee ...................... | B60B 27/0015 |
| | | | 192/45.004 |
| 2017/0267024 A1 * | 9/2017 | Peng ........................ | F16D 41/14 |
| 2020/0398611 A1 * | 12/2020 | Nakajima ............ | B60B 27/0026 |

FOREIGN PATENT DOCUMENTS

TW    M488455    10/2014

* cited by examiner

*Primary Examiner* — Jacob S. Scott
*Assistant Examiner* — Farhana Pervin
(74) *Attorney, Agent, or Firm* — MUNCY, GEISSLER, OLDS & LOWE, P.C.

(57) ABSTRACT

A hub device is provided, including: a hub shell, defining an axial direction, including a room and a projection, the room having an opening open in the axial direction, an inner wall of the room being integrally connected with the projection, the room further including an annular toothed portion, the projection projecting radially within the room; and a ratchet ring, including an outer toothed portion and an engaging slot corresponding to the projection, the ratchet ring being disposing in the room, the outer toothed portion being engaged with the annular toothed portion so that the ratchet ring is rotatable with the hub shell, the engaging slot being disposed on the ratchet ring, the projection being engaged radially within the engaging slot and abutted radially against the hub shell.

10 Claims, 6 Drawing Sheets

HUB DEVICE

BACKGROUND OF THE INVENTION

Field of the Invention

The present invention relates to a hub device.

Description of the Prior Art

In a conventional hub device, such as disclosed in TWM488455, the ratchet ring is arranged on the inner wall of the receiving space of a hub shell, the inner surface of the ratchet ring has a plurality of teeth, the outer wall of the ratchet ring has an external thread portion, the inner wall of the hub shell has an inner thread portion which is screwed with the outer thread portion so that the ratchet ring is fixed on the inner wall of the hub shell.

The hub shell is usually made of aluminum alloy, and the ratchet ring is made of iron. When the ratchet ring drives the hub shell to rotate, the inner thread of the hub shell is easily worn so that the combined structure of the ratchet ring and the hub shell is weak and not durable. In addition, the depth of the thread groove of the inner thread portion is shallow, so it cannot bear large torsion force. As a result, it is not suitable to be applied for a device requiring large torsion force (such as an electric vehicle).

The present invention is, therefore, arisen to obviate or at least mitigate the above-mentioned disadvantages.

SUMMARY OF THE INVENTION

The main object of the present invention is to provide a hub device which is capable of providing good resistivity against the active force in the axial direction and which is durable.

To achieve the above and other objects, a hub device is provided, including: a hub shell, defining an axial direction, including a room and a projection, the room having an opening open in the axial direction, an inner wall of the room being integrally connected with the projection, the room further including an annular toothed portion, the projection projecting radially within the room; and a ratchet ring, including an outer toothed portion and an engaging slot corresponding to the projection, the ratchet ring being disposing in the room, the outer toothed portion being engaged with the annular toothed portion so that the ratchet ring is rotatable with the hub shell, the engaging slot being disposed on the ratchet ring, the projection being engaged radially within the engaging slot and abutted radially against the hub shell.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
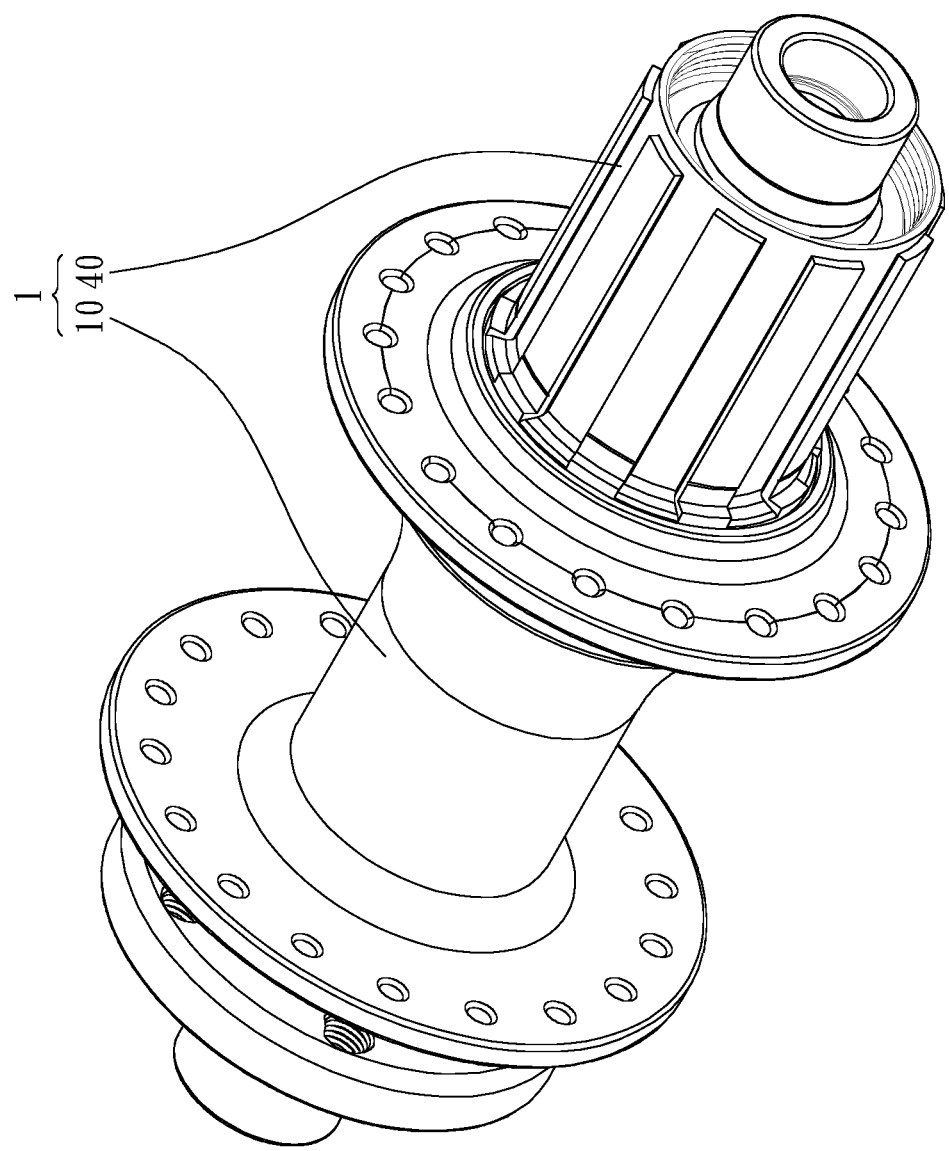
FIG. 1 is a stereogram of a preferable embodiment of the present invention.
Figure 2:
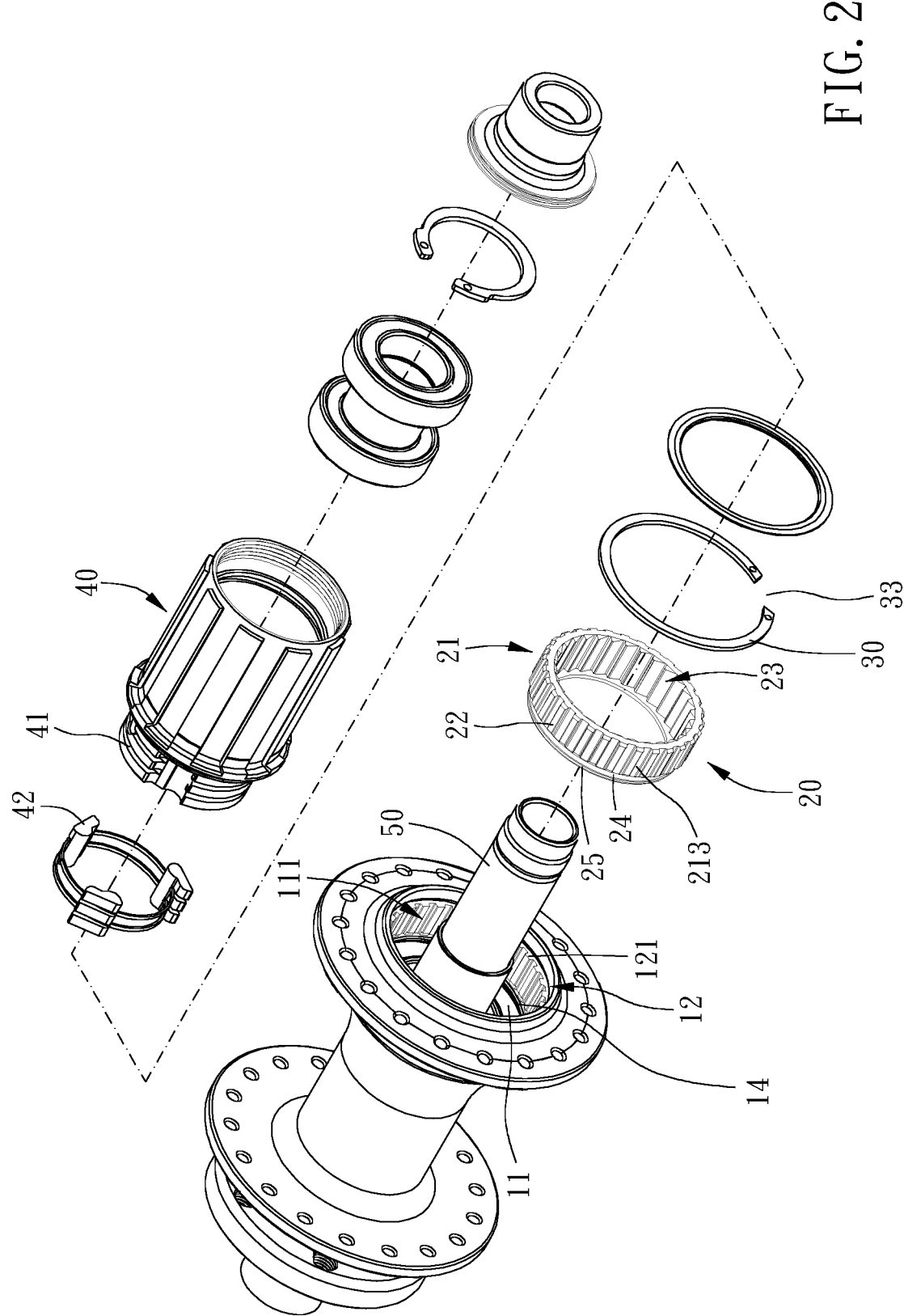
FIG. 2 is a breakdown drawing of a preferable embodiment of the present invention.

Please refer to FIGS. 1 to 8 for a preferable embodiment of the present invention. A hub device 1 of the present invention includes a hub shell 10 and a ratchet ring 20.

The hub shell 10 defines an axial direction A, the hub shell 10 includes a room 11 and a projection 14, the room 11 has an opening 111 open in the axial direction A, an inner wall of the room 11 is integrally connected with the projection 14, the room 11 further includes an annular toothed portion 12, and the projection 14 projects radially within the room 11. The ratchet ring 20 includes an outer toothed portion 21 and an engaging slot 24 corresponding to the projection 14, the ratchet ring 20 is disposing in the room 11, and the outer toothed portion 21 is engaged with the annular toothed portion 12 so that the ratchet ring 20 is rotatable with the hub shell 10. The engaging slot 24 is disposed on the ratchet ring 20, and the projection 14 is engaged radially within the engaging slot 24 and abutted radially against the hub shell 10. Whereby, the hub device 1 is capable of bearing large torsion force and durable, and it provides good and stable combination which is capable of providing good resistivity against the active force in the axial direction A and which is durable because of the engagement of the projection 14 and the engaging slot 24.

The hub shell 10 defines a central axis parallel to the axial direction A, and the projection 14 is an annular flange around the central axis. The projection 14 is preferably a closed annular flange; however, the projection 14 may include a plurality of projections or ribs circumferentially arranged in intervals on the hub shell 10. The engaging slot 24 is an annular concave around the central axis, which enhances combinational strength and is easy to assemble.

The hub shell 10 is made of a first metal material, the ratchet ring 20 is made of a second metal material, and the hardness of the second metal material is larger than the hardness of the first metal material. In this embodiment, the first metal material is made of aluminum alloy, and the second metal material is made of iron, which is advantageous for assembling of the ratchet ring 20 and engagement of the projection 14 within the engaging slot 24. The ratchet ring 20 further includes a protrusion 25 radially protruding outward, the protrusion 25 and the projection 14 are axially blocked with each other, and the protrusion 25 and the outer toothed portion 21 form the engaging slot 24 therebetween. The protrusion 25 and the projection 14 are at least partially overlap with each other in the axial direction A or circumferentially blocked with each other so that it is not easy to disassemble in the axial direction A and so that the projection 14 can be stably positioned within the engaging slot 24.

The projection 14 includes an inclined surface 141 which extends inclinedly toward the opening 111, the protrusion 25 includes an inclined abutting surface 252, and the inclined abutting surface 252 extends inclinedly in a direction away from the opening 111 and is abuttable against the inclined surface 141 in the axial direction A. In this embodiment, the inclined surface 141 and a first horizontal reference line D1 which is parallel to the axial direction A intersect and define a first included angle θ1 therebetween, the inclined abutting surface 252 and a second horizontal reference line D2 which is parallel to the axial direction A intersect and define a second included angle θ2 therebetween, the first included angle θ1 is larger than the second included angle θ2, and the first included angle θ1 and the second included angle θ2 are smaller than 45 degrees. Preferably, the first included angle θ1 is smaller than 35 degrees, and the second included angle θ2 is smaller than 30 degrees. Preferably, the protrusion 25 further includes an end face 251 transverse to the inclined abutting surface 252, and the projection 14 further includes a bottom end face 143 transverse to the inclined surface 141. The protrusion 25 defines a first line 2 located on and extending axially along the end face 251, the projection 14 defines a second line 3 located on and extending axially along the bottom end face 143, and a distance 60 between the first line 2 and the second line 3 is between 0.10 mm to 0.20 mm. In this embodiment, the protrusion 25 is protrusive radially beyond an outer circumferential surface of the ratchet ring 20 in an extent smaller than an extent in which the projection 14 projects radially from an inner surface of the room 11, which is easy in assembling. Specifically, in assembling, the inclined abutting surface 252 of the protrusion 25 is guided by the inclined surface 141 so that at least one of the projection 14 and the protrusion 25 is pressed and deformed radially, which allows the protrusion 25 to engage with the projection 14.

The room 11 has a bottom wall 112, the projection 14 and the bottom wall 112 are arranged in interval, and a distance between the bottom wall 112 and the projection 14 is equal to or, preferably, larger than a thickness of the protrusion 25 in the axial direction A, so that it is easy in assembling and the protrusion 25 can be stably positioned.

The projection 14 further includes a first vertical plane 142, and the protrusion 25 further includes a second vertical plane 253. When the projection 14 is engaged within the engaging slot 24, the second vertical plane 253 is remoter from the opening 111 than the first vertical plane 142, and the first vertical plane 142 and the second vertical plane 253 face each other. The first vertical plane 142 and the second vertical plane 253 are preferably perpendicular to a central line C of the hub shell 10, respectively, for bearing large active force in the axial direction A and avoiding easy disengagement of the ratchet ring 20 from the room 11.

Figure 3:
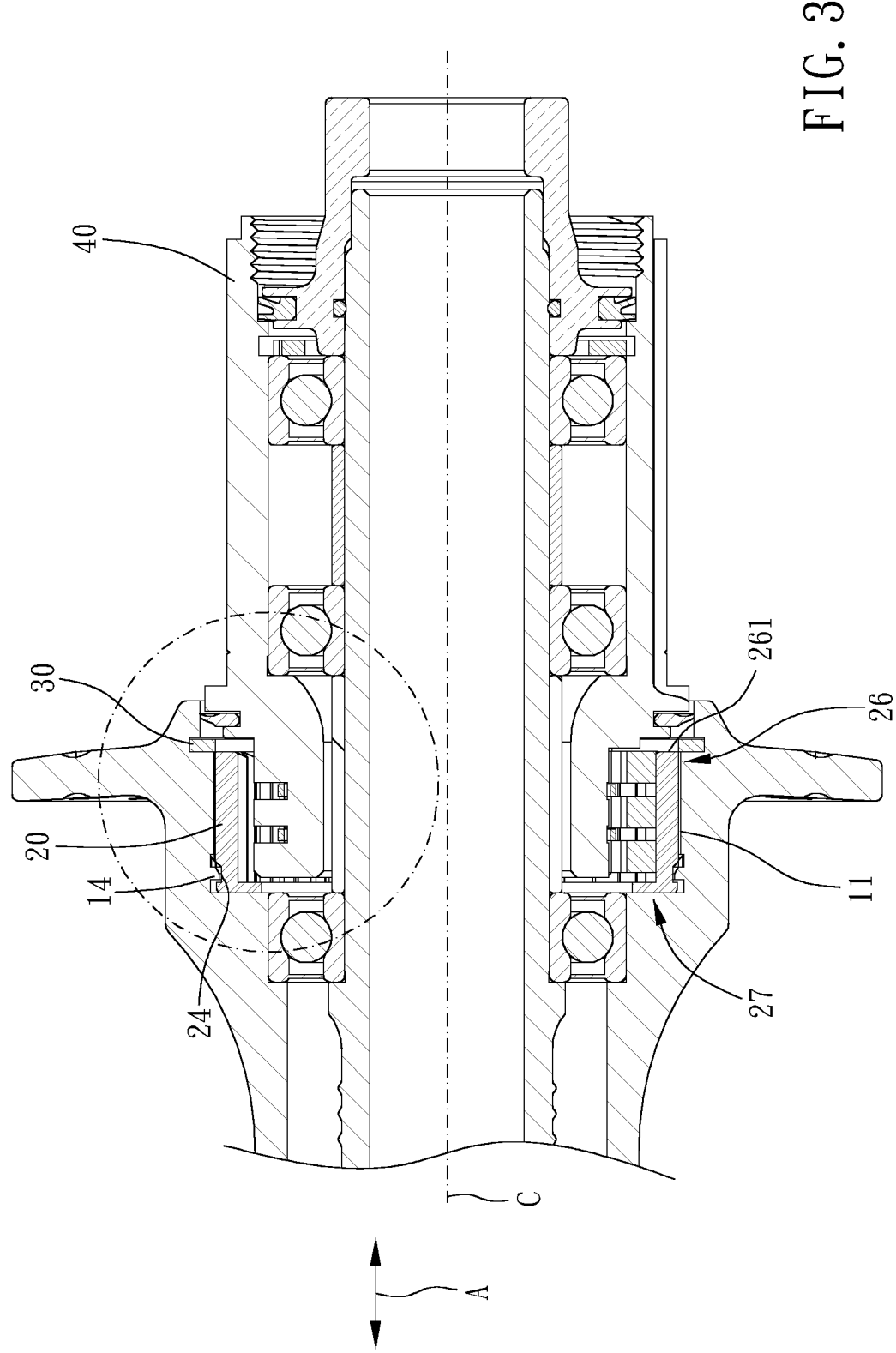
FIG. 3 is a cross-sectional view of a preferable embodiment of the present invention.
Figure 4:
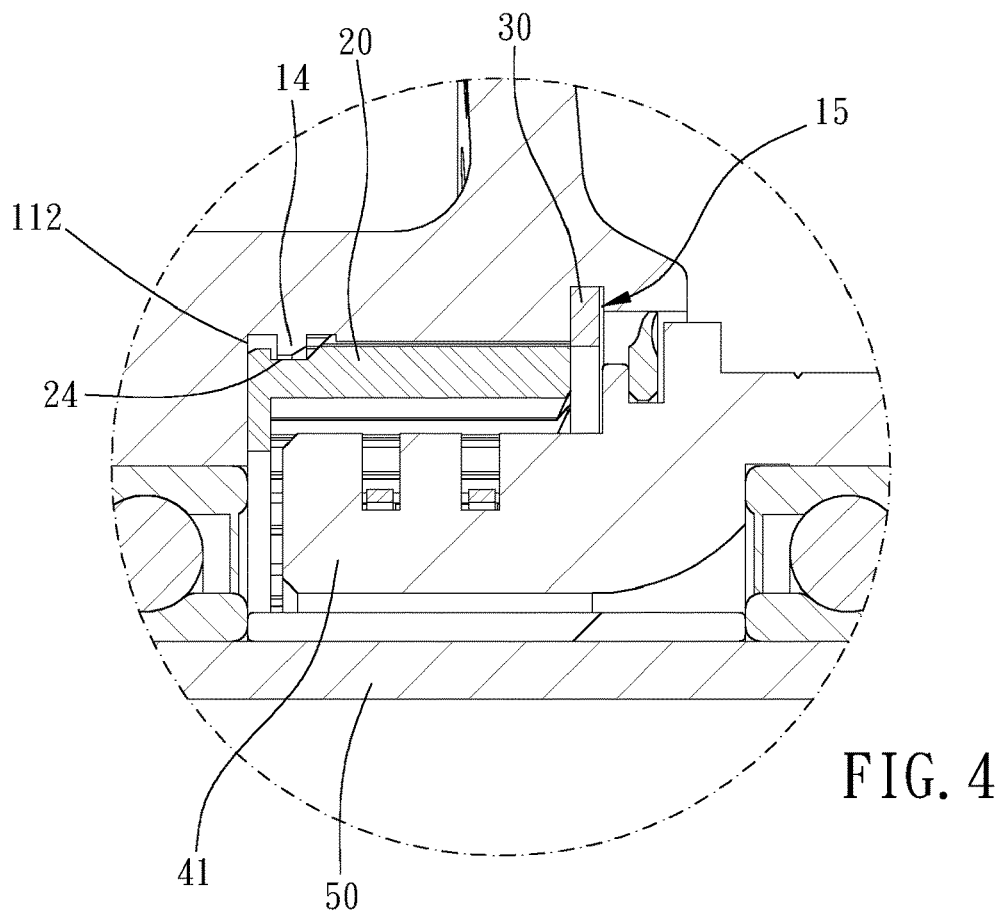
FIG. 4 is an enlargement of FIG. 3.
Figure 5:
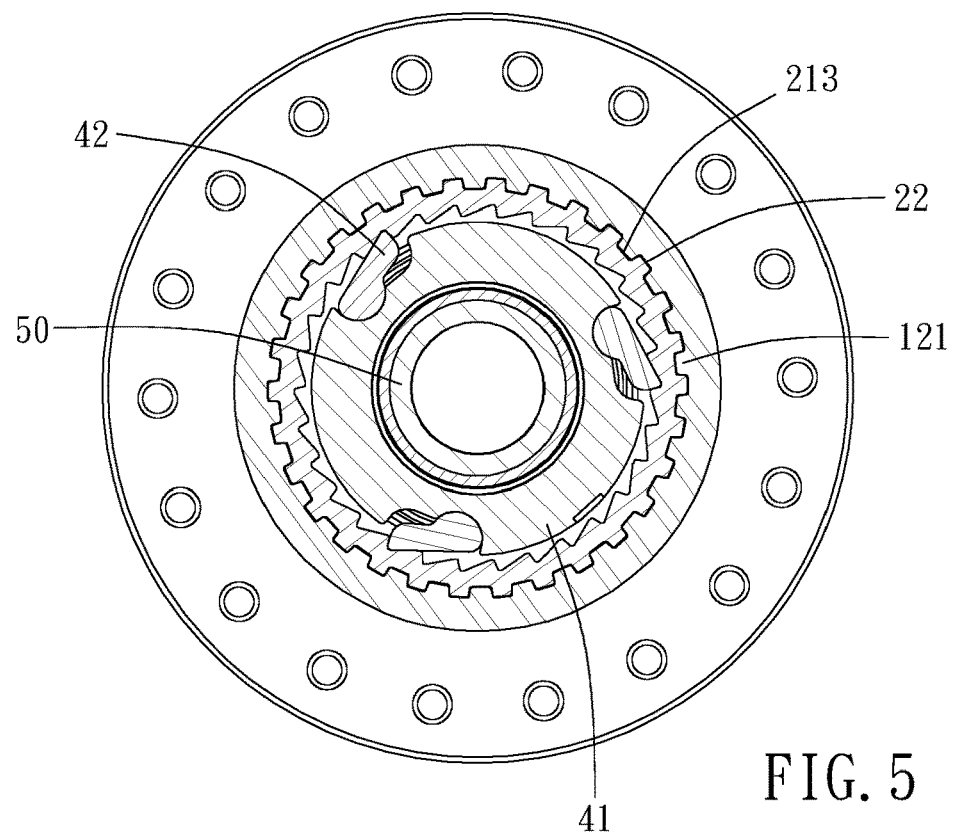
FIG. 5 is another cross-sectional view of a preferable embodiment of the present invention.
Figure 6:
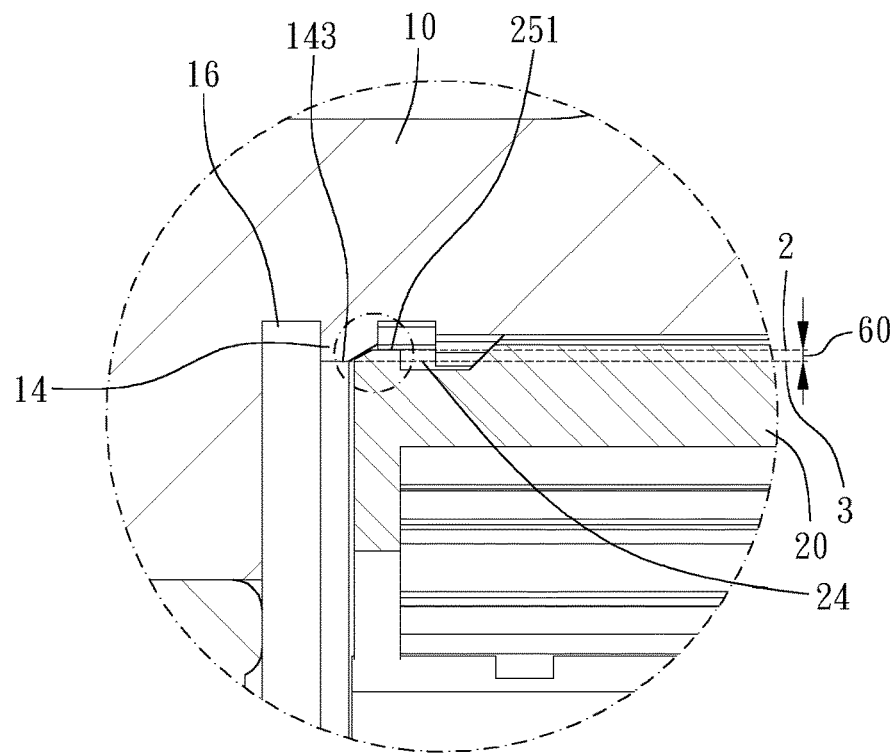
FIG. 6 is a drawing showing a projection and an engaging slot before engaged according to a preferable embodiment of the present invention.
Figure 7:
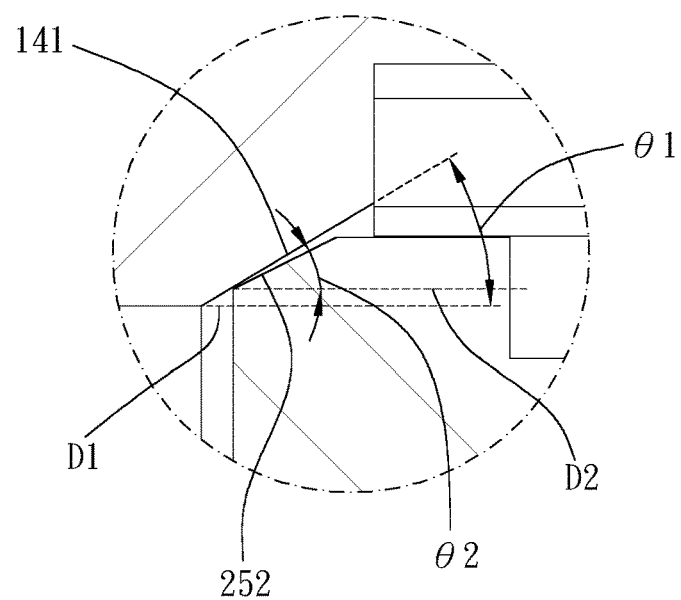
FIG. 7 is a partial enlargement of FIG. 6.
Figure 8:
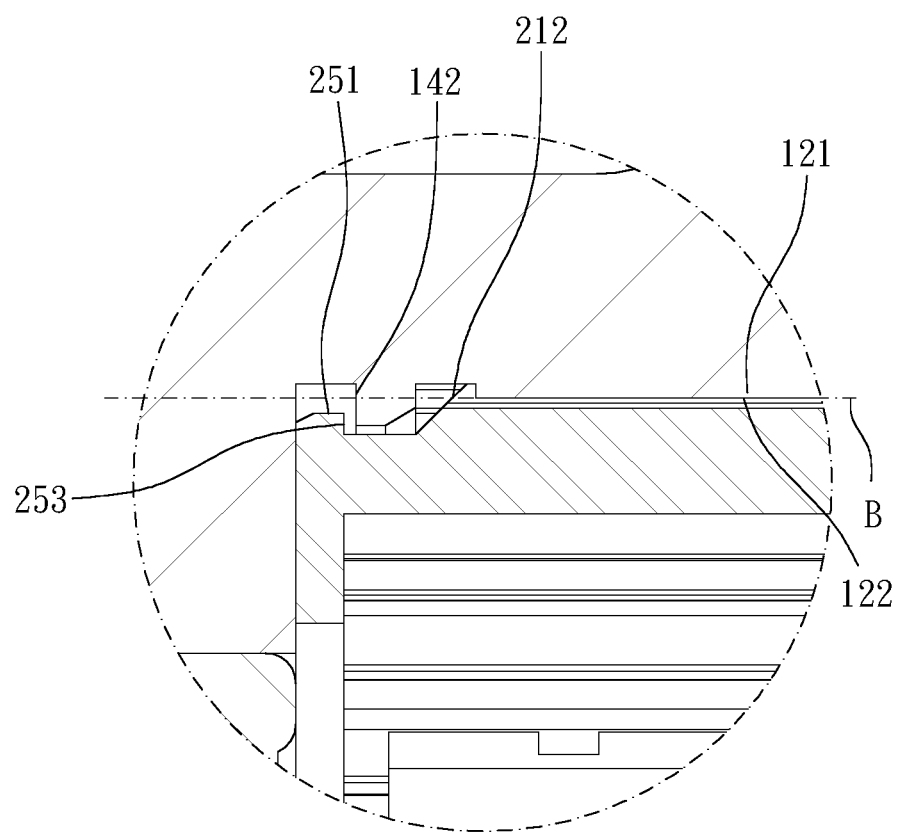
FIG. 8 is a drawing showing the projection and the engaging slot after engaged according to a preferable embodiment of the present invention.

The outer toothed portion 21 includes a plurality of inner recesses 213, the annular toothed portion 12 includes a plurality of outer teeth 121, the plurality of outer teeth 121 and the plurality of inner recesses 213 are engaged with each other, each of the plurality of outer teeth 121 has a boundary B located on and extending axially along an end face 122 of one of the plurality of outer teeth 121, and the end face 251 of the protrusion 25 is more adjacent to the central line C of the hub shell 10 than the boundary B of each of the plurality of outer teeth 121, as shown in FIGS. 3 and 8. The outer toothed portion 21 further includes a plurality of engaging teeth 22, the plurality of engaging teeth 22 and the plurality of inner recesses 213 are circumferentially arranged alternatively, and an end of each of the plurality of engaging teeth 22 includes an incline 212 defining the engaging slot 24 with the second vertical plane 253 and corresponding to the inclined surface 141. During assembling of the ratchet ring 20 to the room 11, the protrusion 25 and the outer tooth 121 are free of interfering and blocking.

The hub device 1 further includes a sprocket mounting seat 40, the sprocket mounting seat 40 includes a pawl mounting seat 41 and a plurality of pawls 42, the plurality of pawls 42 are mounted to the pawl mounting seat 41, the ratchet ring 20 further includes an inner toothed portion 23 corresponding to the outer toothed portion 21, the pawl mounting seat 41 is disposed through the inner toothed portion 23, and the plurality of pawls 42 are engaged with the annular toothed portion 12. In the axial direction A, the protrusion 25 is remoter from the opening 111 than the sprocket mounting seat 401. In this embodiment, the inner toothed portion 23 and the outer toothed portion 21 are integrally formed on inner and outer sides of the ratchet ring 20, respectively.

The hub device 1 further includes a blocking member 30, the room 11 further includes an annular trench 15, the blocking member 30 is disposed within the annular trench 15, and the blocking member 30 and the ratchet ring 20 are blocked with each other in the axial direction A. Preferably, the blocking member 30 is annular and includes a notch 33. Specifically, the blocking member 30 is radially deformable relative to the notch 33 so that the blocking member 30 can be stably positioned within the annular trench 15. The annular trench 15 is more adjacent to the opening 111 than the projection 14, the ratchet ring 20 includes a first end portion 26 and a second end portion 27 opposite to the first end portion 26, the first end portion 26 is more adjacent to the opening 111 than the second end portion 27, the blocking member 30 is abutted axially against an end surface 261 of the first end portion 26, the engaging slot 24 is disposed on the second end portion 27, so that the force exerted on the ratchet ring 20 can be distributed on the blocking member 30 and the projection 14, thus preventing the ratchet ring 20 from disengaging from the hub shell 10 and being capable of providing good resistivity against the active force in the axial direction A.

The hub device 1 further includes an axle 50, and the axle 50 is disposed through the hub shell 10, the ratchet ring 20, the blocking member 30 and sprocket mounting seat 40.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A hub device, including:
   a hub shell, defining an axial direction, including a room and a projection, the room having an opening open in the axial direction, an inner wall of the room being integrally connected with the projection, the room further including an annular toothed portion, the projection projecting radially within the room; and
   a ratchet ring, including an outer toothed portion and an engaging slot corresponding to the projection, the ratchet ring being disposing in the room, the outer toothed portion being engaged with the annular toothed portion so that the ratchet ring is rotatable with the hub shell, the engaging slot being disposed on the ratchet ring, the projection being engaged radially within the engaging slot and abutted radially against the hub shell.

2. The hub device of claim 1, wherein the ratchet ring further includes a protrusion radially protruding outward, the protrusion and the projection are axially blocked with each other, and the protrusion and the outer toothed portion form the engaging slot therebetween.

3. The hub device of claim 2, wherein the outer toothed portion includes a plurality of inner recesses, the annular toothed portion includes a plurality of outer teeth, the plurality of outer teeth and the plurality of inner recesses are engaged with each other, each of the plurality of outer teeth defines a boundary located on and extending axially along an end face of one of the plurality of outer teeth, and an end face of the protrusion is more adjacent to a central line of the hub shell than the boundary of each of the plurality of outer teeth.

4. The hub device of claim 2, wherein the projection includes an inclined surface which extends inclinedly toward the opening, the protrusion includes an inclined abutting surface, and the inclined abutting surface extends inclinedly in a direction away from the opening and is abuttable against the inclined surface in the axial direction.

5. The hub device of claim 4, wherein the inclined surface and a first horizontal reference line which is parallel to the axial direction intersect and define a first included angle therebetween, the inclined abutting surface and a second horizontal reference line which is parallel to the axial direction intersect and define a second included angle therebetween, the first included angle is larger than the second included angle, and the first included angle and the second included angle are smaller than 45 degrees.

6. The hub device of claim 4, wherein the protrusion further includes an end face transverse to the inclined abutting surface, the projection further includes a bottom end face transverse to the inclined surface, the protrusion defines a first line located on and extending axially along the end face, the projection defines a second line located on and extending axially along the bottom end face, and a distance between the first line and the second line is between 0.10 mm to 0.20 mm.

7. The hub device of claim 6, wherein the hub shell defines a central axis parallel to the axial direction, the projection is an annular flange around the central axis, and the engaging slot an annular concave around the central axis; the hub shell is made of a first metal material, the ratchet ring is made of a second metal material, and the hardness of the second metal material is larger than the hardness of the first metal material; the inclined surface and a first horizontal reference line which is parallel to the axial direction intersect and define a first included angle therebetween, the inclined abutting surface and a second horizontal reference line which is parallel to the axial direction intersect and define a second included angle therebetween, and the first included angle is larger than the second included angle; the first included angle is smaller than 35 degrees, and the second included angle is smaller than 30 degrees; the projection further includes a first vertical plane, the protrusion further includes a second vertical plane; when the projection is engaged within the engaging slot, the second vertical plane is remoter from the opening than the first vertical plane, and the first vertical plane and the second vertical plane face each other; the outer toothed portion includes a plurality of inner recesses, the annular toothed portion includes a plurality of outer teeth, the plurality of outer teeth and the plurality of inner recesses are engaged with each other, each of the plurality of outer teeth has a boundary located on and extending axially along an end face of one of the plurality of outer teeth, and an end face of the protrusion is more adjacent to a central line of the hub shell than the boundary of each of the plurality of outer teeth; the outer toothed portion further includes a plurality of engaging teeth, the plurality of engaging teeth and the plurality of inner recesses are circumferentially arranged alternatively, and an end of each of the plurality of engaging teeth includes an incline defining the engaging slot with the second vertical plane and corresponding to the inclined surface; the hub device further includes a sprocket mounting seat, the sprocket mounting seat includes a pawl mounting seat and a plurality of pawls, the plurality of pawls are mounted to the pawl mounting seat, the ratchet ring further includes an inner toothed portion corresponding to the outer toothed portion, the pawl mounting seat is disposed through the inner toothed portion, and the plurality of pawls are engaged with the annular toothed portion; in the axial direction, the protrusion is remoter from the opening than the sprocket mounting seat; the hub device further includes a blocking member, the room further includes an annular trench, the blocking member is disposed within the annular trench, and the blocking member and the ratchet ring are blocked with each other in the axial direction; the annular trench is more adjacent to the opening than the projection, the ratchet ring includes a first end portion and a second end portion opposite to the first end portion, the first end portion is more adjacent to the opening than the second end portion, the blocking member is abutted axially against the first end portion, and the engaging slot is disposed on the second end portion; the blocking member is annular and includes a notch radially opened; the hub device further includes an axle, and the axle is disposed through the hub shell, the ratchet ring, the blocking member and sprocket mounting seat; the protrusion is protrusive radially beyond an outer circumferential surface of the ratchet ring in an extent smaller than an extent in which the projection projects radially from an inner surface of the room; the room has a bottom wall, the projection and the bottom wall are arranged in interval, and a distance between the bottom wall and the projection is equal to or larger than a thickness of the protrusion in the axial direction.

8. The hub device of claim 2, wherein further includes a sprocket mounting seat, the sprocket mounting seat includes a pawl mounting seat and a plurality of pawls, the plurality of pawls are mounted to the pawl mounting seat, the ratchet ring further includes an inner toothed portion corresponding to the outer toothed portion, the pawl mounting seat is disposed through the inner toothed portion, and the plurality of pawls are engaged with the annular toothed portion; in the axial direction, the protrusion is remoter from the opening than the sprocket mounting seat.

9. The hub device of claim 1, further including a blocking member, wherein the room further includes an annular trench, the blocking member is disposed within the annular trench, and the blocking member and the ratchet ring are blocked with each other in the axial direction.

10. The hub device of claim 9, wherein the annular trench is more adjacent to the opening than the projection, the ratchet ring includes a first end portion and a second end portion opposite to the first end portion, the first end portion is more adjacent to the opening than the second end portion, the blocking member is abutted axially against the first end portion, and the engaging slot is disposed on the second end portion.

\* \* \* \* \*